United States Patent [19]

Kensler, Jr. et al.

[11] 4,123,552

[45] Oct. 31, 1978

[54] COMPOSITIONS FOR PRESERVING CROPS AND ANIMAL FEEDSTUFFS

[75] Inventors: Daniel L. Kensler, Jr., West Des Moines, Iowa; Gustave K. Kohn, Berkeley, Calif.; David D. Walgenbach, Brookings, S. Dak.

[73] Assignee: Chevron Research Company, San Francisco, Calif.

[21] Appl. No.: 623,287

[22] Filed: Oct. 17, 1975

Related U.S. Application Data

[63] Continuation-in-part of Ser. No. 468,629, May 9, 1974, Pat. No. 3,931,412, which is a continuation-in-part of Ser. No. 266,945, Jun. 28, 1972, abandoned, which is a continuation-in-part of Ser. No. 71,364, Sep. 11, 1970, abandoned, which is a continuation-in-part of Ser. No. 871,940, Oct. 28, 1969, abandoned.

[51] Int. Cl.$^2$ .................................................. A01N 9/24
[52] U.S. Cl. ........................................ 424/311; 260/408; 260/410.5; 260/410.6; 424/212; 424/213; 424/218; 424/305; 424/307; 424/308; 424/312; 560/1; 560/100; 560/105; 560/106; 560/107; 560/111; 560/112; 560/122; 560/123; 560/254; 560/263; 560/264

[58] Field of Search ................ 260/408, 410.5, 410.6, 260/488 CD, 488 GM, 494, 469, 476 R, 488 J; 424/308, 307, 305, 311; 560/254, 263, 264

[56] References Cited

U.S. PATENT DOCUMENTS

| | | | |
|---|---|---|---|
| 2,866,813 | 12/1958 | McTeer | 260/488 GM |
| 2,889,358 | 6/1959 | Guest et al. | 260/488 GM |
| 2,889,359 | 6/1959 | Guest et al. | 260/488 GM |
| 3,574,714 | 4/1971 | Fujinami et al. | 260/487 |
| 3,927,078 | 12/1975 | Lapporte et al. | 260/494 |

FOREIGN PATENT DOCUMENTS 289 of 1881 United Kingdom ............ 260/488 CD

*Primary Examiner*—Vivian Garner
*Attorney, Agent, or Firm*—Dix A. Newell; Raymond Owyang

[57] ABSTRACT

Fungus and mold growth in crops and organic matter are inhibited by the use of bis-carboxylic acid esters and compositions thereof. In a preferred embodiment, crops and animal feedstuffs are preserved during storage by applying a microbiocidal amount of a mono-, di or trioxymethylene, or lower alkylidene bis-alkanoate, or a mixture thereof.

4 Claims, No Drawings

COMPOSITIONS FOR PRESERVING CROPS AND ANIMAL FEEDSTUFFS

CROSS-REFERENCE TO RELATED APPLICATIONS

This application is a continuation-in-part of application Ser. No. 468,629, filed May 9, 1974, now U.S. Pat. No. 3,931,412, which in turn is a continuation-in-part of Ser. No. 266,945, filed June 28, 1972, which in turn is a continuation-in-part of Ser. No. 71,364, filed Sept. 11, 1970, which in turn is a continuation-in-part of Ser. No. 871,940, filed Oct. 28, 1969, all of which have been abandoned, but the disclosures of which are incorporated by reference.

BACKGROUND OF THE INVENTION

This invention concerns methods and compositions for inhibiting fungus and mold growth of organic matter, particularly crops and animal feedstuffs.

Organic matter, particularly in a moist and warm environment, is highly susceptible to attack by fungi and molds. The problems of fungus and mold growth are particularly acute in the storage of crops, such as seeds and cereal grains. Several methods are or have been used to preserve such crops, e.g., grains, during storage. The most common method is to dry the grain to below about 15 percent by weight moisture and store it in substantially moisture-free containers. Other physical treatments, such as refrigeration and storage techniques, e.g., sealing the grain in oxygen-free containers, have been used or suggested in the past.

Additionally, there have been a variety of chemical treatments used or proposed for preserving high moisture grain Large numbers of compounds have been tested for such use. See *Cereal Chem.*, 28, 196–207 (1951); *Plant Physiol.*, 24:2 241–254 (1949); *Can. J. Research*, 16C, 241–247 (1938); *Grain Science*, 104, 463–464 (1948); *Ind. Eng. Chem.*, 7, 709–712 (1915); Yearbook of Agriculture, U.S.D.A. 1950–51; and U.S. Pat. No. 2,584,972.

Chemical treatments are advantageous over drying in that they may be readily carried out by the farmer at the harvest location without a large equipment investment. In this respect many farmers presently transport their freshly harvested grain to large independently operated dryers. Additionally, the grain does not have to be remoistened for feeding purposes when chemical treatment is employed. Also, special containers do not have to be used and the preservation is effective after the grain is removed from storage. Since grain may be used primarily as an animal feed, it is desirable, if not imperative, that the chemical used to treat the grain not leave toxic or potentially toxic residues on the grain. Because of this many excellent agricultural fungicides — while highly effective — are not considered practical for grain storage. Consequently, the agricultural industry has looked mainly at relatively innocuous materials which leave no such residues. Currently, propionic acid is being promoted for this use. It is highly effective, relatively inexpensive, allegedly non-toxic and fairly easy to handle and apply. See "Studies on Feed Spoilage", L. R. Richardson and J. V. Halick, Texas Agr. Expt. Stat. Bull. 879 (1957) and British Pat. No. 1,155,485.

SUMMARY OF THE INVENTION

It has now been found that fungus and mold growth in crops, particularly high moisture seeds and cereal grains, are inhibited by treating the crops with a fungicidal amount of certain bis-carboxylic acid esters such as mono-, di-, trioxymethylene, and alkylidene bis-alkanoates. In addition to inhibiting the growth of fungi and molds, the bis-esters, particularly bis-alkanoates, employed in the method of the invention generally do not leave toxic or potentially toxic residues on the crop or animal feedstuff treated, are essentially non-corrosive to metals, have nutritional value as food supplements, and preserve and/or increase the nutritional value of the crop or animal feedstuff treated.

DESCRIPTION OF THE INVENTION

The Bis-Esters

Crops are preserved against fungus and mold attack in accordance with the present invention by treatment thereof with a microbiostatic and/or microbiocidal amount of a bis-ester of the formula:

wherein R and $R^2$ independently are hydrocarbyl groups of 1 to 10 carbon atoms; R' is hydrogen or hydrocarbyl group of 1 to 10 carbon atoms optionally substituted with 0 to 5 chlorine atoms; and n is a whole integer of from 1 to 3 inclusive.

Representative hydrocarbyl groups which R, R' and $R^2$ may represent include alkyl groups such as methyl, ethyl, n-propyl, isopropyl, n-butyl, isobutyl, n-pentyl, 2-methylbutyl, hexyl, isohexyl, heptyl, decyl, etc; cycloalkyl groups such as cyclobutyl, cyclopentyl, cyclohexyl, methylcyclohexyl, cycloheptyl, cyclooctyl, etc; aromatic groups such as phenyl; naphthyl; alkaryl of 7 to 10 carbon atoms, e.g. o-tolyl, p-tolyl, xylyl, 2,4,6-trimethylphenyl, 2,4-diethylphenyl, 4-t-butylphenyl, 3,5-diisopropylphenyl, etc.; aralkyl of 7 to 10 carbon atoms, e.g., benzyl, 3-phenylpropyl, 3-(p-tolyl)propyl, 4-phenylbutyl, etc.

Representative chlorohydrocarbyl groups which R' may represent include the chloroalkyl groups of 1 to 4 carbon atoms and 1 to 5 chloro groups such as chloromethyl, dichloromethyl, trichloromethyl, pentachloroethyl, 3-chloropropyl, 2-chlorobutyl, etc.; and chloroaryl groups such as p-chlorophenyl, m-chlorobenzyl, etc.

R and $R^2$ are preferably lower alkyl of 1 to 6 carbon atoms. More preferably, R and $R^2$ are the same lower alkyl group.

R' is preferably hydrogen or lower alkyl of 1 to 6 carbon atoms, especially methyl.

Representative bis-esters of the Formula I are illustrated in Table I, wherein R, R', $R^2$ and n have the significance previously defined.

TABLE I

| R | R' | $R^2$ | n |
|---|---|---|---|
| Methyl | H | Methyl | 1, 2 or 3 |
| Methyl | H | Ethyl | 1 |
| Methyl | H | Propyl | 2 |
| Ethyl | H | Ethyl | 3 |
| Propyl | H | Propyl | 1, 2 or 3 |
| Isopropyl | H | Isopropyl | 1, 2 or 3 |
| n-Butyl | H | n-Butyl | 1, 2 or 3 |
| Isobutyl | H | Isobutyl | 1 or 2 |
| Methyl | Methyl | Methyl | 1 |
| Ethyl | Methyl | Ethyl | 1 |

TABLE I-continued

| R | R' | R² | n |
|---|---|---|---|
| Propyl | Methyl | Cyclohexyl | 1 |
| Isopropyl | Methyl | Isopropyl | 1 |
| Methyl | Ethyl | Methyl | 1 |
| Methyl | Ethyl | Hexyl | 1 |
| Hexyl | Ethyl | Hexyl | 1 |
| Decyl | Hexyl | Decyl | 1 |
| p-Chlorophenyl | H | Methyl | 1 |
| Benzyl | Methyl | Benzyl | 1 |
| Tolyl | H | Tolyl | 1 |
| Methyl | Phenyl | Methyl | 1 |
| Ethyl | Tolyl | Propyl | 1 |
| Methyl | Trichloromethyl | Ethyl | 1 |
| Ethyl | Trichloromethyl | Ethyl | 1 |
| Propyl | Chloromethyl | Propyl | 1 |

The bis-esters of the invention are suitably employed alone or as a mixture of several different bis-esters.

The preferred bis-esters of the invention are mono-, di- or trioxymethylene bis-alkanoates (i.e., bis-esters of Formula (I) wherein R and R² are alkyl, R' is hydrogen and $n$ is 1, 2 or 3) and alkylidene bis-alkanoates (i.e., bis-esters of Formula (I) wherein R, R' and R² are alkyl and $n$ is 1). These bis-alkanoates are preferred in part because of their low mammalian toxicity and their nutritional value.

Preparation of Bis-Esters

The bis-esters can be prepared by the reaction of a carboxylic acid anhydride and formaldehyde or aldehydes according to the following Equation (1)

$$R'CHO \;+\; \overset{O}{\underset{\|}{R}}COC\overset{O}{\underset{\|}{R^2}} \;\longrightarrow\; \overset{O}{\underset{\|}{R}}CO(CHO)_n\overset{O}{\underset{\|}{C}}R^2 \qquad (1)$$

wherein R, R', R² and $n$ have the same significance as previously defined.

Generally, stoichiometric amounts of the aldehyde and anhydride are used. Polymers of the aldehydes, e.g., trioxane, that depolymerize under reaction conditions are convenient sources of the same aldehydes. The reaction is catalyzed with Lewis acids such as boron trifluoride or strong inorganic acids such as sulfuric or phosphoric acid. Reaction temperatures range from 50° to 150° C., preferably from 75° to 125° C. Generally, a mixture of products wherein $n$ is 1, 2 and 3 is formed in the reaction. The mixture of products can be employed in the method of the invention without separation. Alternatively, the mixture can be separated by fractional distillation.

The preparation of alkylidene bis-alkanoates according to Equation (1) is disclosed by E. H. Man, J. J. Sanderson and C. R. Hauser, *J. Amer. Chem. Soc.*, 70, 847 (1950) and the preparation of oxymethylene bis-acetate according to Equation (1) is disclosed by C. J. Tomiska and E. Spousta, *Chem. Comm.* 211 (1962).

Utility

The bis-esters are useful for controlling fungi such as molds, mildews, and yeasts. The bis-esters are particularly effective for the control of seed- and soil-borne fungi such as Rhizopus species, Penicillium species, Fusarium species, and Aspergillus species.

The bis-esters are applied in fungicidal amounts by conventional art methods to the fungi or organic matter (host growth environments) which is subject to fungal attack, especially vegetative organic matter such as crops and animal feedstuffs.

The term "crops" as used in the present invention is intended to include any substance grown from the soil, either in the form as gathered from the field or after suitable modification in form, such as by pressing, grinding or pressing into a paste, flour, etc., or as by germinating into a seedling, e.g., bean sprouts. Thus, the term "crops" refers to forage crops such as alfalfa, clover, hay, fodder, etc.; seeds such as cereal grains, e.g., flax, corn, wheat, oats, rice, barley, rye; legumes, e.g., soybeans, peas, blackbeans; nut seeds, e.g., peanuts, walnuts, pecans, sunflower seeds, almonds, chestnuts, hazel nuts. Additional crops include silage, green wood such as lumber, wood chips, wood pulp; green manure such as lawn grass clippings; vegetable crop residue feeds such as carrot greens; tubers and roots of plants such as potatoes, beets, yams, etc.; flour bulbs such as tulip bulbs, daffodil bulbs, etc.; dried fruits such as dates, apricots, figs, etc.; crop by-products such as citrus pulp and pomace, apple pomace, beet pulp, almond hulls, etc.

In addition to vegetative products such as crops, the bis-esters are broadly applicable for inhibiting fungus growth in any organic material susceptible to attack by soil- and seed-borne fungi. For example, the bis-esters are useful for inhibiting fungus growth in organic materials of animal origin such as leathers, wool, etc. and non-vegetative animal feedstuffs such as fish meal, etc.

The bis-esters are preferably employed for the control of fungus growth in crops which are especially susceptible to attack by soil- and seed-borne fungi. The bis-esters derived from fatty acids, i.e., bis-alkanoates, are particularly preferred for inhibiting fungus growth in crops, such as forage crops and cereal grains, and foodstuffs used for animal and human consumption. Such bis-alkanoates have nutritional value, contribute to the palatability of the foodstuffs and crops treated, preserve the carotene value, proteins, vitamins and other nitrients of the foodstuffs and crops treated.

The bis-alkanoates are especially useful for treating feedstuffs and crops used as feeds for ruminant animals.

Dosage

The dosage levels at which the bis-esters are applied to prevent fungus and mold growth depend upon the type of crop or animal feedstuff being treated, its moisture content, the temperature and the period over which preservation against fungi growth is desired. Generally, amounts of bis-ester ranging from about 0.02 percent weight to 15 percent weight, based on weight of the crop or animal feedstuff being treated, are satisfactory for most applications, although amounts of 0.1 percent weight to 5 percent weight, calculated on the same basis, are more often employed. In the preservation of crops such as cereal grains and seeds during storage, amounts of bis-ester ranging from 2 to 20 weight ounces per bushel are generally suitable. The dosages defined above are also sufficient to preserve and promote the nutritional value of edible feedstuffs such as crops and animal feedstuffs.

The bis-ester compounds used in this invention are normally liquid and are, therefore, conveniently applied neat with liquid sprayers and dispersers to the crop or fungus growth environment. If desired, the bis-ester compounds may be applied with biologically inert solvents in amounts from about 0.05 to 95 percent weight, based on weight solvent, to facilitate their uniform application to the substance being treated.

Examples of suitable organic solvents include aromatic hydrocarbons such as benzene, toluene; lower alkyl ketones such as acetone and methylethyl ketone; petroleum fractions; alcohols (especially lower molecular weight alcohols); and chlorinated aliphatic hydrocarbons such as methylene chloride. The lower alkylidene bis-alkanoates are generally water-miscible so that water is a convenient solvent for these bis-esters. Mixtures of water and organic solvents may also be used for the bis-esters.

In addition to the liquid solvent formulations, the bis-esters may also be combined with other compounds such as dispersing agents, adjuvants, food additives, and other pesticides. The bis-esters are particularly useful in combination with other compounds because of the ability of the bis-esters to dissolve a variety of types of compounds.

A useful combination comprises the bis-esters and fungi growth inhibitors such as lower alkanoic acids of 1 to 5 carbon atoms or solutions of alkanoic acids and formaldehyde. Inhibition of fungus growth in crops with alkanoic acids is disclosed in U.S. Pat. No. 3,595,665, issued July 27, 1971, and British Pat. No. 1,155,485, issued June 18, 1969.

In the treatment of crops and foodstuffs used for animal and human consumption, the bis-esters are suitably employed in combination with an anti-oxidant. The combination of the bis-esters and the anti-oxidant are particularly useful for conserving the palatability and nutritional values of foods. Examples of suitable anti-oxidants which can be combined with the oxyalkylene compounds include hindered or partially hindered phenols such as p-hydroxybenzoic acid methyl ester, 2,6-(di-t-butyl)-p-cresol, 3-t-butyl-4-hydroxyanisole, 2-t-butyl-4-hydroxyanisole, 2,2'-methylene-bis-4-methyl-6-t-butylphenol, etc.; dialkyl thiodipropionates such as dilauryl thiodipropionate and distearyl thiodipropionate; amine anti-oxidants such as diphenylamine, N,N'-di-sec-butyl-1,4-phenylenediamine, phenothiazole, etc. Anti-oxidants, such as 2,6-(di-t-butyl)-p-cresol, which are approved for use on foodstuffs or in packaging of foodstuffs are preferred for this application.

The weight of bis-ester to anti-oxidant can be varied over wide limits. Generally, however, the percent weight of bis-ester, based on total composition, of from about 5 to 95 percent, and percent weight of anit-oxidant, based on total composition of from about 5 to 95 percent, are satisfactory.

Another useful combination comprises liquid formulations of the bis-esters and other pesticides. The bis-alkanoates are particularly useful in such formulations because of the ability of the bis-alkanoates to rapidly penetrate organic matter and the solvent properties of the bis-alkanoates for various pesticides. For example, a combination of a bis-alkanoate and an insecticide provide penetrability, insecticidal action and fungicidal action in the same formulation. Such a formulation would be particularly useful for termite and rot control of wood products, e.g., lumber.

EXAMPLES

The following examples illustrate the compounds and/or compositions and methods of this invention. The examples are intended to illustrate the invention and are not considered restrictive of the invention as otherwise described herein. Indicated ratios and percentages are by weight unless otherwise indicated.

Example 1 — Preparation of Methylene Bispropionate 6 g. (0.2 mol of formaldehyde) of paraformaldehyde and 26 g. (0.2 mol) of propionic anhydride were mixed in a vessel to which one drop of $H_2SO_4$ was added. The tube was sealed and heated at 100° C. for 18 hours.

In a companion preparation, 21 g. (0.7 mol of formaldehyde) of paraformaldehyde and 91.0 g. (0.7 mol) of propionic anhydride were mixed in a reaction flask to which one drop of $H_2SO_4$ was added. The mixture was refluxed for 2 hours.

The two mixtures were combined and fractionated. The first fraction, 93 g., boiled at 90° to 95° C. at 25 mm pressure. The second fraction, 22 g., boiled at 130° C. at 25 mm pressure. The product of the first fraction was identified by nuclear magnetic resonance (NMR) as methylene bispropionate. The product of the second fraction was identified by NMR as oxybismethylene bispropionate.

Example 2 — Preparation of Oxybismethylene Bispropionate 44.5 g. (1.5 mol of formaldehyde) of paraformaldehyde and 200.0 g. (1.25 mol) of oxymethylene bispropionate were mixed in a vessel to which one drop of $H_2SO_4$ was added. The vessel was sealed and heated at 100° C. for 72 hours. Fractionation of the product gave oxybismethylene bispropionate (ca. 50%) having a boiling point of 85.5° C. at 1 mm pressure and bisoxymethylene bispropionate (ca. 15%) having a boiling point of 98° C. at 1 mm pressure.

Example 3 — Preparation of Methylene Bisacetate and Oxybismethylene Bisacetate 20.4 g. of acetic anhydride (0.2 mol), 6.0 g. of paraformaldehyde (0.2 mol of formaldehyde) and 2 drops of sulfuric acid were heated at 100° C. in a sealed tube for 18 hours. Fractionation of the product gave methylene bisacetate and oxybismethylene acetate.

Example 4 — Preparation of Methylene Bisisobutyrate and Oxybismethylene Bisisobutyrate A 30 g. (0.33 mol) sample of trioxane was added to a solution of 158 g. (1 mol) isobutyric anhydride and 0.5 ml. 70% perchloric acid over a 30-minute period at 65°–70° C. The reaction mixture was then stirred until the temperature decreased to 27° C. The reaction mixture was diluted with saturated sodium bicarbonate solution and extracted with ether. The ether extracts were dried over magnesium sulfate and evaporated under reduced pressure. The resulting residue was distilled on a 30 cm. column to give 112 g. of methylene bisisobutyrate, b.p. 43°–48° C. at 0.2–0.3 mm of Hg and 30 g. of oxybismethylene isobutyrate, b.p. 57°–63° C. at 0.2–0.3 mm of Hg.

Example 5 — Preparation of Methylene Bisbutyrate and Oxybismethylene Bisbutyrate Trioxane (0.33 mol) and butyric anhydride (1 mol) were reacted using perchloric acid as catalyst by the procedure employed in Example 4. The resulting methylene bisbutyrate product (82 g.) distilled at 55°–58° C. (0.02 mm/Hg) and the resulting oxybismethylene bisbutyrate product (33 g.) distilled at 65°–68° C. (0.02 mm/Hg).

Example 6 — Preparation of Benzylidene Bispropionate

Benzaldehyde (1.5 mol) and propionic anhydride (1.5 mol) were reacted in the presence of 0.5 ml. perchloric acid by the procedure of Example 4. The resulting benzylidene bispropionate distilled at 104° C. (0.1 mm/Hg).

Example 7 — Ethylidene Bispropionate

An 88 g. (2 mol) sample of acetaldehyde was added in small portions to a solution of 260 g. (2 mol) of propionic anhydride at 60° C. The reaction mixture was then stirred at about 25° C. for 7 hours. The reaction mixture was diluted with saturated sodium bicarbonate solution and extracted with methylene dichloride. The methylene dichloride extracts were dried over magnesium sulfate and evaporated under reduced pressure. The resulting residue was distilled through a 16-inch column to give 316.5 g. of ethylidene bispropionate, b.p. 57° C. (1 mm/Hg).

Example 8 — 2,2,2-Trichloroethylidene Bispropionate

Trichloroacetaldehyde (0.2 mol) and propionic anhydride (0.2 mol) were reacted in the presence of 0.2 ml. 70% perchloric acid by the procedure of Example 4. The resulting 2,2,2-trichloroethylidene bispropionate product (13 g.) distilled at 65°-66° C. (0.1 mm/Hg). Elemental analysis for $C_8H_{11}Cl_3O_4$ showed:

|      | Calculated | Found |
|------|------------|-------|
| Cl % | 38.3       | 38.1  |

Example 9

High moisture corn (25 percent moisture) was treated with various methylene and polyoxymethylene esters of propionic or acetic acid of various dosages. The esters were applied to the corn in a mixer for one minute at 32 RPM. Three replicate two gallon ventilated cans were filled with the treated corn. The cans were then held at a temperature of 70°-72° F. Temperature readings were taken semi-weekly by means of thermocouples in the center of each can. When the temperature exceeded constant room temperature for at least an 8-hour period the treatment was considered broken.

Visual observations were also made on the amount of corrosion damage to the can (due principally to moisture condensation). This damage was also rated on a 1-10 basis; 1 indicating no corrosion and 10 indicating heavy corrosion.

The results of these tests are tabulated in Table II.

TABLE II

| Compound | Rate Oz/Bu | Weeks Effective | Corrosion 42 Days | Corrosion 83 Days |
|---|---|---|---|---|
| Propionic acid | 2 | 6 | 0 | — |
|  | 3 | 6 | 0 | — |
|  | 4 | 12+ | 0 | 1 |
|  | 6 | 12+ | 2 | 3 |
| Methylene Bispropionate | 3 | 12+ | — | — |
|  | 6 | 12+ | — | — |
| Oxybismethylene Propionate | 2 | 6 | 0 | — |
|  | 3 | 12 | 0 | 0.5 |
|  | 4 | 12+ | 0.5 | 0.5 |
|  | 5 | 12+ | 1 | 1 |
| Methylene Bisacetate | 3 | 6 | — | — |
|  | 6 | 12+ | — | — |
| Oxybismethylene Acetate | 3 | 5 | — | — |
|  | 6 | 12+ | — | — |

+Indicates treatement stiu effective and not broken at time indicated.

As can be seen from Table II, the compounds of the present invention were at least as effective as propionic acid in the treatment of high moisture corn. Methylene bispropionate and oxybismethylene propionate were remarkably superior to propionic acid in the preservation of high moisture corn. Further, while the acetates were effective preservatives, it is noted that the propionates are far superior to the acetates. This, of itself, was unexpected. Oxybismethylene bispropionate is far less corrosive than propionic acid which is a very desirable characteristic. Furthermore, visual observation of the color of the thus treated corn indicated that the corn treated with the compounds of the present invention had better color characteristics than the corn treated with propionic acid. The propionic acid treated corn was off-color, that is either light or dark.

Example 10

Methylene bispropionate was applied to a variety of crops at various dosages by spraying or in a mixer. Two ventilated cans were filled with each treated crop. The cans were then maintained at 70° F. ±5° F. Each can was periodically visually observed for fungal growth and the observations were translated into a growth rating on a 1-10 basis; 1 indicating no growth and 10 indicating heavy uniform growth. For comparison, two samples of each untreated crop were also tested. The crops employed, the percent weight methylene bispropionate (MBP) based on weight crop, and the fungal rating 2, 7-8 and 28-29 days after treatment are tabulated in Table III.

TABLE III

| Crop | % Wt MBP | Fungal Rating (Days) 2 | 7-8 | 28-29 |
|---|---|---|---|---|
| Wood Chips (freshly cut) | 1.4 | 0 | 0 | 0 |
|  | 0 | 6 | 8 | — |
| Sorghum (33% $H_2O$) | 0.51 | 0 | 0 | 0 |
|  | 0 | 8 | 10 | — |
| Wheat (26% $H_2O$) | 0.6 | 0 | 0 | 0 |
|  | 0 | 0.5 | 3 | — |
| Hay (4" seedlings) | 2.4 | 0 | 0 | 4 |
|  | 0 | 2 | 10 | — |
| Soybeans (26% $H_2O$) | 0.51 | 0 | 0 | 0 |
|  | 0 | 0 | 10 | — |

Example 11

A variety of bis-esters was tested for the control of seed- and soil-borne pathogens during storage of corn seeds (*Zea mays*) by the following procedure.

A small amount of acetone was added to the bis-ester to make specific volume, plus a small portion of emulsifier making it into a slurry. This preparation was diluted with water to the desired concentration. Solution was then evenly distributed on the wall of a glass jar. High moisture feedcorn with natural infection was stored frozen after harvest until used for this test. The corn seeds were rolled in the jar until they were coated and the solution was completely absorbed on them.

Following the treatment, the corn seeds were plated on Potato Dextrose Agar plates. For comparison, untreated corn seeds were also plated. Propionic acid was also tested for comparison.

The percentage control of all species was based on the total sum average of mycelial growth in millimeters of all species in the treated seeds relative to the untreated check. The fast growing Rhizopus was evaluated 7 days after treatment, the other fungi after 14 days.

The bis-ester treated, the concentration active ingredient (ounces/100 lbs. of seeds), the average mycelial growth in millimeters each pathogen (average of 4 replicates), sum of the averages of all species and the percent control are tabulated in Table IV.

TABLE IV

| Compound | Conc. Oz./100 Lbs. | Average Mycelial Growth (mm) Rhizopus | Penicillium | Fusarium | % Control All Species |
|---|---|---|---|---|---|
| Ethylidene Bispropionate | 16 | 2.3 | 1.05 | 0 | 91 |
| | 6.4 | 6.7 | 5.4 | 1.4 | 83 |
| | 2.5 | 11.4 | 5.6 | 1.2 | 50 |
| | 1.0 | 11.5 | 5.7 | 3.0 | 44 |
| Methylene Bisisobutyrate | 16 | 0 | 0.6 | 0 | 98 |
| | 6.4 | 0 | 0 | 0 | 100 |
| | 2.5 | 0.35 | 0 | 0 | 99 |
| | 1.0 | 0.32 | 0.3 | 0 | 98 |
| Oxybismethylene Bisisobutyrate | 16 | 0 | 0 | 0 | 100 |
| | 6.4 | 0 | 0 | 0 | 100 |
| | 2.5 | 0 | 4.8 | 0 | 87 |
| | 1.0 | 0 | 9.7 | 0 | 73 |
| Benzylidene Bispropionate | 16 | 0.6 | 2.8 | 0 | 91 |
| | 6.4 | 4.4 | 2.7 | 0.6 | 79 |
| | 2.5 | 14.3 | 2.3 | 0 | 54 |
| | 1.0 | 15.9 | 3.9 | 0 | 46 |
| Methylene Bisbutyrate | 16 | 0 | 0 | 0 | 100 |
| | 6.4 | 0 | 0 | 0 | 100 |
| | 2.5 | 0 | 0 | 0 | 100 |
| | 1.0 | 0 | 2.4 | 0 | 93 |
| Oxybismethylene Bisbutyrate | 16 | 0 | 0 | 0 | 100 |
| | 6.4 | 0 | 0 | 0 | 100 |
| | 2.5 | 0 | 0 | 0 | 100 |
| | 1.0 | 0 | 0 | 0 | 100 |
| 2,2,2-Trichloroethylidene Bispropionate | 18 | 1.3 | 2.6 | 0 | 89 |
| | 6.4 | 5.2 | 4.1 | 0 | 74 |
| | 2.5 | 5.3 | 4.5 | 7 | 54 |
| | 1.0 | 19.3 | 4.4 | 9.6 | 8 |
| Methylene Bispropionate | 16 | 0 | 0 | 0 | 100 |
| | 6.4 | 0 | 0 | 0 | 100 |
| | 2.5 | 0 | 0 | 0 | 100 |
| | 1.0 | 0 | 0.32 | 0.9 | 97 |
| Ethylidene Bisacetate | 16 | 0 | 0 | 0 | 100 |
| | 6.4 | 2.6 | 0 | 0 | 93 |
| | 2.5 | 4.3 | 0 | 0.5 | 87 |
| | 1.0 | 10.0 | 0.1 | 2.3 | 60 |
| Propionic Acid | 16 | 0 | 0.42 | 0 | 99 |
| | 6.4 | 0.4 | 0 | 0 | 99 |
| | 2.5 | 3.4 | 1.9 | 9.1 | 60 |
| | 1.0 | 11.1 | 3.8 | 11.2 | 28 |
| Control | 0 | 19.6 | 4.7 | 12.1 | — |

Example 12

A variety of bis-esters was tested for the control of seed- and soil-borne pathogens during the storage of corn seeds (Zea mays) by the procedure of Example 11. For comparison, propionic acid was also tested.

Control of each pathogen was determined by mycelial growth in millimeters in the treated seeds relative to untreated seeds. Mycelial growth of Rhizopus species and Fusarium species was evaluated 5 days after treatment. Mycelial growth in Aspergillus niger was evaluated 14 days after treatment.

The bis-ester tested and the concentration of active ingredient in ounces per 100 lbs. of corn seeds for 90 percent control of each pathogen species are tabulated in Table V.

TABLE V

| Compound | Conc. (oz./100 lbs.) for 90% Control Rhizopus sp. | Fusarium sp. | Aspergillus nigen |
|---|---|---|---|
| Propionic Acid | 3.8 | 9.6 | 3.4 |
| Methylene Bisisobutyrate | 3.2 | 2.0 | * |
| Oxybismethylene Bisisobutyrate | 1.2 | 0.88 | 0.88 |
| Oxybismethylene Bisbutyrate | 1.1 | 1.0 | 0.57 |
| Methylene Bispropionate | 0.85 | 0.5 | 0.16** |

*No Control at 2.5 oz./100 lbs.
**0.16 oz./100 lbs. gave 99% control

Example 13

Methylene bispropionate was subjected to acute oral toxicity studies using white rats. This compound was found to have an LD-50 of 2800 mg/kg body weight of white rats.

Example 14

Methylene bispropionate was tested as a solvent for various insecticides. S-[1,2-bis(ethoxycarbonyl)ethyl]-O,O-dimethyl phosphorodithioate (Malathion) and O,O-diethyl-O-p-nitrophenyl phosphorothioate (parathion) was miscible with methylene bispropionate in all proportions. O,S-dimethyl N-acetyl phosphoramidothioate was soluble in methylene bispropionate to the extent of 5 percent by weight. Chlordane was soluble in methylene bispropionate to the extent of at least 75 percent by weight.

Example 15

Microbiological tests were conducted to determine the antimicrobial activity of methylene bispropionate (MBP).

The minimum concentration of MBP, capable of inhibiting the growth of five species of bacteria, two species of mold and one species of yeast was determined.

Petri plates containing nutrient agar and various concentrations of MBP were inoculated with each of the test species. The identification of these organisms and the effective concentration of MBP inhibiting growth are shown below:

| Organism | Germistatic Concentration of MBP (ppm) |
|---|---|
| Candida albicans | 1,000 |
| Staphylococcus aureus | 1,000 |

-continued

| Organism | Germistatic Concentration of MBP (ppm) |
|---|---|
| Escherichia coli | 6,000 |
| Streptococcus pyogenes | 700 |
| Aspergillus niger | 800 |
| Trichophyton interdigitale | 800 |
| Pseudomonas aeruginosa | 7,000 |
| Bacillus subtilis | 8,000 |

I claim:

1. A composition useful for preventing the growth of fungi in crops and animal feedstuffs and for conserving the palatability and nutritional values of said crops and animal feedstuff comprising an oxidation inhibiting amount of an antioxidant selected from hindered phenols and dialkyl thiodipropionates and a fungicidally effective amount of bis-ester of the formula

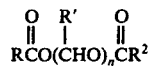

wherein R and $R^2$ independently are alkyl of 1 to 6 carbon atoms, R' is chloroalkyl of 1 to 4 carbon atoms and 1 to 5 chloro groups or alkaryl of 7 to 10 carbon atoms, and $n$ is 1, 2 or 3, or a mixture thereof.

2. The composition of claim 1 wherein R' is chloroalkyl and $n$ is 1.

3. The composition of claim 1 wherein the diester is 2,2,2-trichloroethylidene bispropionate.

4. The composition of claim 1 wherein R' is alkaryl of 7 to 10 carbon atoms.

* * * * *

UNITED STATES PATENT AND TRADEMARK OFFICE
CERTIFICATE OF CORRECTION

PATENT NO. : 4,123,552

DATED : October 31, 1978

INVENTOR(S) : Daniel L. Kensler, Jr. et al

It is certified that error appears in the above-identified patent and that said Letters Patent are hereby corrected as shown below:

Col. 4, line 12, "flour" should read --flower--.

Col. 4, line 35, "nitrients" should read --nutrients--.

Col. 5, lines 41-42, "anit-oxidant" should read --anti-oxidant--

Col. 7, line 61, "stiu" should read --still--.

Col. 9, Table IV, line 15 of figures should read

| Conc. | Rhizopus | Penicillium | Fusarium | All Species |
|---|---|---|---|---|
| --2.5 | 14.3 | 2.3 | 0 | 46-- |

Col. 9, Table IV, line 25 of figures, first column Conc. "18" should read --16--.

Col. 9, Table IV, line 36 of figures, column 3 of figures "0.1" should read --2.1--.

Col. 9, Table V, (See Page 2)

UNITED STATES PATENT AND TRADEMARK OFFICE
CERTIFICATE OF CORRECTION

PATENT NO. : 4,123,552
DATED : October 31, 1978
INVENTOR(S) : Daniel L. Kensler, Jr. et al It is certified that error appears in the above-identified patent and that said Letters Patent are hereby corrected as shown below:

PAGE 2

Col. 9, Table V, line 58, the following was omitted:

| Compound | Rhizopus sp. | Fusarium sp. | nigen |
|---|---|---|---|
| Methylene Bisbutyrate | 1.3 | 0.83 | 0.88 |

Signed and Sealed this

*Thirteenth* Day of *November 1979*

[SEAL]

Attest:

RUTH C. MASON
*Attesting Officer*

LUTRELLE F. PARKER
*Acting Commissioner of Patents and Trademarks*